United States Patent [19]

Seide et al.

[11] Patent Number: 5,516,206
[45] Date of Patent: May 14, 1996

[54] CHARGING APPARATUS INCLUDING A FEED CHUTE AND TAMPING TOOL BENT IN A CIRCULAR ARC SHAPE FOR INNER MIXERS, HELICAL EXTRUDERS, OR THE LIKE

[75] Inventors: Adolf Seide, Siegburg, Germany; Wolfgang Engel, Stratford, Canada

[73] Assignee: Krupp Maschinentechnik GmbH, Essen, Germany

[21] Appl. No.: 211,812

[22] PCT Filed: Aug. 20, 1993

[86] PCT No.: PCT/EP93/02230

§ 371 Date: Apr. 21, 1994

§ 102(e) Date: Apr. 21, 1994

[87] PCT Pub. No.: WO94/04332

PCT Pub. Date: Mar. 3, 1994

[30] Foreign Application Priority Data

Aug. 22, 1992 [DE] Germany .......................... 42 27 906.2

[51] Int. Cl.⁶ .................................................. B29B 7/24
[52] U.S. Cl. .................................................... 366/76.7
[58] Field of Search ........................... 366/30, 41, 68, 366/69, 76, 80, 83–85, 76.7, 76.8, 76.9, 181.1, 183.1; 425/204, 207, 208, 209, 583

[56] References Cited

U.S. PATENT DOCUMENTS

| | | | |
|---|---|---|---|
| 1,518,129 | 12/1924 | Banbury | 366/76 |
| 1,520,001 | 12/1924 | Banbury | 366/76 |
| 1,905,755 | 4/1933 | Schnuck et al. | 366/76 |
| 1,938,377 | 12/1933 | Ducharme et al. | 366/76 |
| 2,351,706 | 6/1944 | Robinson | 366/76 |
| 2,446,657 | 8/1948 | MacLeod et al. | 366/76 |
| 2,947,030 | 8/1960 | Varn | 425/208 X |
| 3,525,387 | 8/1970 | Matsuoka | |
| 3,858,857 | 1/1975 | Ulm | 366/76 X |
| 4,512,664 | 4/1985 | Oiwa | 366/76 |
| 4,877,328 | 10/1989 | Muller et al. | 366/76 |

FOREIGN PATENT DOCUMENTS

| | | | |
|---|---|---|---|
| 0272338 | 6/1988 | European Pat. Off. | |
| 0402723 | 12/1990 | European Pat. Off. | |
| 578328 | 8/1930 | Germany | |
| 1279535 | 10/1968 | Germany | |
| 1964895 | 7/1971 | Germany | |
| 3234300 | 3/1984 | Germany | |
| 4038365 | 2/1992 | Germany | |
| 5436367 | 3/1979 | Japan | |
| 61-261008 | 11/1986 | Japan | 366/69 |
| 703015 | 1/1954 | United Kingdom | |

OTHER PUBLICATIONS

"Revue Generale Du Caoutchoucs", vol. 41, No. 7–8, Aug. 1964, Paris, France, pp. 1125–1134; E. Stalinsky Mélangeurs internes a palettes superposées.

N. N.: "Bei der Produktion geräuscharm in–line zerkleinern". In: Plastverarbeiter, 41. Jahrgang, No. 4, 1990, pp. 96, 98.

*Primary Examiner*—Charles E. Cooley
*Attorney, Agent, or Firm*—Spencer & Frank

[57] ABSTRACT

A loading device for kneaders, screw-type extruding machines or the like, having at least one feed chute and at least one tamping tool, wherein the feed chute is provided with at least one loading opening, the feed chute is bent—completely or partially—in the shape of a circular arc, as is the tamping tool. The tamping tool is seated to pivot around a pivot point that forms the mid-point of the circular arc-shaped bend. Because of this, the front plate of the tamping tool follows a circular arc-shaped path of movement.

9 Claims, 3 Drawing Sheets

1

CHARGING APPARATUS INCLUDING A FEED CHUTE AND TAMPING TOOL BENT IN A CIRCULAR ARC SHAPE FOR INNER MIXERS, HELICAL EXTRUDERS, OR THE LIKE

BACKGROUND OF THE INVENTION

The invention relates to a loading device for kneaders, screw-type extruding machines or the like, having at least one feed chute and at least one tamping tool, the feed chute being provided with at least one load opening.

In the known loading devices of the above-named type for kneaders, a rectangular or round plunger is moved linearly up and down in a rectangular or round loading chute. The plunger is secured to a plunger rod and is guided by the rod. The loading chute has an opening that can be sealed by means of a flap and that permits horizontal filling (EP 0,272,338).

The known loading devices for kneaders have considerable drawbacks. For example, the height of the known loading devices is several times greater than the actual required plunger stroke. Moreover, the flexural and torsional strengths of the plunger rod stipulated by its large length/diameter ratio are not sufficient to guide the plunger in a defined manner without contact with the loading chute. The resulting wear of the known loading devices has a consequence, although minor, of contamination of the mixed material by material particles. In addition, the plunger is constantly twisted in the loading chute during the mixing process, and knocks against the loading chute. This can result in a fatigue fracture in the cooling water lines and damage to the chute plates. Furthermore, when recipes are changed the mixer must be cleaned frequently in order to prevent contamination of the subsequent mixture. Because it is very difficult to gain access to the upper region of the known loading devices, lengthy cleaning times and subsequently long machine down times result.

The object of the known loading devices of the above type for screw-type extruding machines as tamping mechanisms is to present the caoutchouc material that results in irregular form to the barrel extruder and generating a pressing force in the caoutchouc so that the caoutchouc material is drawn into the extruder evenly and with high efficiency. The loading devices are configured as linear tamping tools and encompass two rectangular, hydraulically linearly moved tamping tool plungers disposed radially to the screw-type extruding machine, of which plungers the one, as the secondary tamping tool, presents the caoutchouc material to the barrel extruder and the other, as the main tamping tool, applies the radial pressing force to draw in the material.

The known loading devices for screw-type extruding machines are relatively expensive in production, require a large amount of space, and cause considerable problems with respect to cleaning and maintenance. In addition, because of the force relationships that result during operation, they require a holding mechanism that leads to large, interfering sealing gaps.

SUMMARY OF THE INVENTION

It is an object of the invention to configure the loading device mentioned at the outset in such a way that it is simple and easy to use, as well as disturbance- and maintenance-free, and does not have the above-named drawbacks of the known loading devices.

The solution of the object lies in the fact that, in a loading device of the type mentioned at the outset, the feed chute is—entirely or partially—bent, as is the tamping tool, and that the tamping tool is disposed to pivot around a pivot point that forms the mid-point of the circular arc-shaped bend, so that the front plate of the tamping tool is followed by a circular arc-shaped path of movement.

An essential advantage of the loading device of the invention is that its height is reduced to approximately one-third with respect to the known loading devices. A further advantage is that, as a consequence of the defined movement of the tamping tool on a circular path around a fixed pivot point in connection with the twist-resistant construction, significantly less wear of the tamping tool and the feed chute occurs. The circular arc-shaped path of movement of the front plate of the tamping tool assures a very effective and operationally reliable initiation and transmission of force. Forces can be received from different directions without necessitating special seating arrangements. Moreover, optimization of the gap between the tamping tool and the feed chute is possible in the loading device of the invention. Thus, the rear gap and lateral gaps must be as small as possible to prevent contamination of the feed chute, while the forward gap can be left large to permit the escape of the air entrapped in the fillers. This also assures a defined "overflow" of the tamping tool on the front side to be cleaned.

In an embodiment of the invention, cooling bores, a mass temperature sensor and/or a softener injection valve are provided on the underside of the tamping tool. The cooling bores can be fed through hoses placed in the tamping tool, so pipes that must be sealed with packing bushings are no longer required. Additional materials processing options result from the provision of the underside of the tamping tool with a mass temperature sensor and/or a softener injection valve, which is possible because of the improved accessibility to the tamping tool.

In a further embodiment of the invention, grooves for receiving brushes, strippers or the like are provided on the underside of the tamping tool. With these, the feed chute can be cleaned in a simple manner and in a short time by means of repeated insertion and removal of the tamping tool.

The pivoting of the tamping tool around the pivot point can be effected pneumatically, hydraulically, mechanically or electrically. It is recommended that the pivoting of the tamping tool be effected by a drive that actuates the tamping tool in the manner of a bell-crank lever. The reaction forces resulting from the force initiation cause pressure stresses in the feed chute and in the contiguous components, and hence press them against the joints, preventing the danger that exists in the known loading devices configured as the highest tamping tool pressure, namely that the affected screw connections that additionally lie in the region of linear tamping tools will loosen.

In the loading device of the invention, the pivot point of the tamping tool is advisably disposed in the separating plane between the mixing chamber of the kneader and the feed chute. Because the tamping tool also travels slightly beneath the separating plane in this case, a change in the mixing chamber in the loading region is necessary. When existing mixers are retrofitted with a loading device of the invention, the chute plates must therefore be removed and replaced with new chute plates whose inside contour has the radius of the feed chute.

In accordance with a further feature of the invention, two adjacent tamping tools are provided in the loading device.

Hence, the position of the front plates of the tamping tools can be selected such that they extend parallel to the wall of the feed chute when the tamping tool is pivoted back, and thus offer only slight resistance to the movement of the processing material in the feed direction toward the barrel extruder. In contrast, when the tamping tool is pivoted forward, its front plate is at least nearly tangential to the barrel extruder and, on the way toward it, generates an optimum tamping tool effect because of the increasing approach to the force effect radial thereto.

In a preferred embodiment of the invention, the tamping tool or tools can be pivoted completely out the feed chute. Because of this, cleaning and maintenance of the tamping tool and the feed chute are facilitated.

The loading device of the invention can be further improved in that the two movement tracks of the tamping tools extend opposite one another in a transverse plane to the barrel extruder of a screw-type extruding machine, that the wall of the feed chute is planar in the region of the tamping tools and is provided with an opening for the passage of each tamping tool, and that the tamping tools are seated to pivot around pivot axes that lie approximately in the extension of the feed chute and, on both sides of the barrel extruder, at its height and parallel to it.

The position of the movement racks assures a problem-free course of the tamping tool process. The two tamping tool arrangements, including the movement courses—if necessary, staggered in time, advisably occurring alternatingly—can be configured to coincide or be symmetrical. This simplification also results in a further improvement in production and storage expenditures. The adaptation of the tamping tools to the wall of the feed chute can be effected in such a manner that when the tamping tool is pivoted back, its front plate ends flush with the wall.

A further improvement in the loading device of the invention is achieved in that side walls that extend in the direction of the movement track and whose length corresponds to the stroke of the tamping tools adjoin the front plates of the two tamping tools. The tamping tool is thus limited in its dimensions to the smallest necessary size. On the inner circular arc side, it shortens with respect to the outside to correspond to the small spacing from the pivot axis.

In a modification of the invention, the feed chute is provided with inwardly-oriented strippers in the region of the side wall of the two tamping tools remote from the barrel extruder, and the front plates of the two tamping tools are provided on their sides facing the pivot axes with stripper edges that glide along the transition wall of the feed chute, which is drawn in this case toward the barrel of the barrel extruder and is shaped to correspond to the movement of the two tamping tools. The particular structure of the loading device of the invention is thus utilized for the longest-lasting seal between the tamping tool and the feed chute, with a self-cleaning effect.

BRIEF DESCRIPTION OF THE DRAWINGS

The invention is described in detail below by way of two embodiments in connection with the drawing figures. Shown are in.

DETAILED DESCRIPTION OF THE PREFERRED EMBODIMENTS

Figure 1:
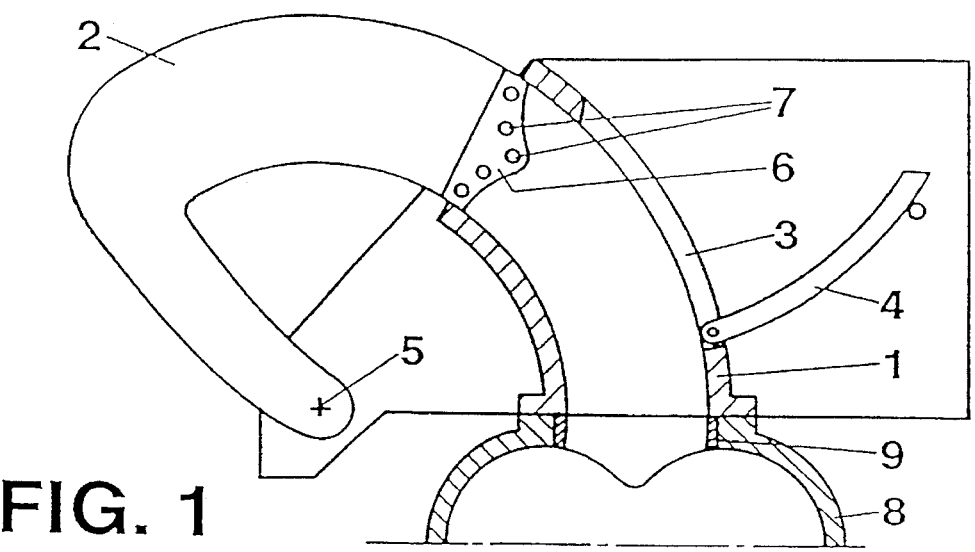
FIG. 1 the loading device of a kneader, wherein only the upper part of the kneader is shown, in a longitudinal section, in the loaded position.
Figure 2:
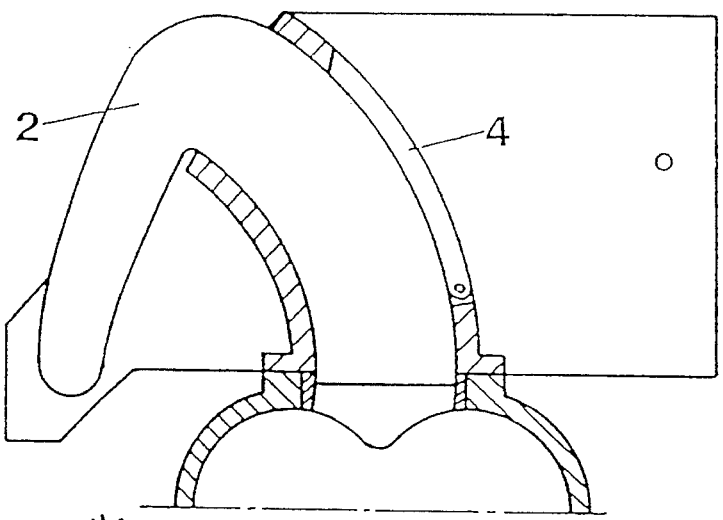
FIG. 2 the loading device of FIG. 1 in the mixing position.
Figure 3:
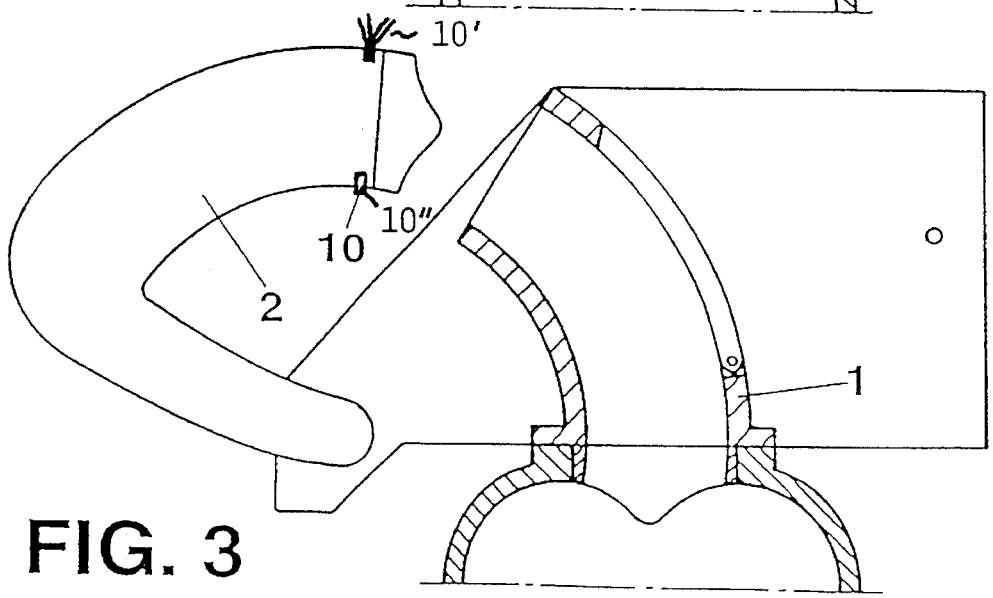
FIG. 3 the loading device of FIG. 1 in the cleaning position.

The loading device shown in FIGS. 1 through 3 essentially comprises a feed chute 1 and a tamping tool 2, which are bent to have a circular arc shape. The feed chute 1 is provided with a loading opening 3 that can be sealed by means of a flap 4. The tamping tool 2 is disposed to pivot around a pivot point 5, the pivot point 5 forming the mid-point of a circular bend. The pivoting of the tamping tool 2 around the pivot point 5 is effected by a drive—not shown— that actuates the tamping tool 2 in the manner of a bell-crank lever. The drive can be effected pneumatically, hydraulically, mechanically or electrically. A front plate 6 is disposed on the underside of the tamping tool 2. Moreover, cooling bores 7 are provided on the underside of the tamping tool 2. The pivot point 5 of the tamping tool 2 is disposed in the separating plane between the mixing chamber of the kneader 8 and the feed chute 1. In its upper region, the kneader 8 has a chute plate 9 whose inside contour is adapted to the radius of the feed chute 1.

To load the kneader 8, the tamping tool 2 and the flap 4 are moved into the position illustrated in FIG. 1.

During the mixing process, the tamping tool 2 and the flap 4 are located in the position illustrated in FIG. 2.

When cleaning of the tamping tool 2 and the feed chute 1 is to be executed, the tamping tool 2 is moved completely out of the feed chute 1 into the position illustrated in FIG. 3. This position permits grooves 10, located at the underside of the tamping tool 2, to be provided with bristles 10', strippers 10" or the like, with whose aid the entire feed chute 1 can be cleaned in a short time by means of repeated insertion and removal of the tamping tool 2.

Figure 4:
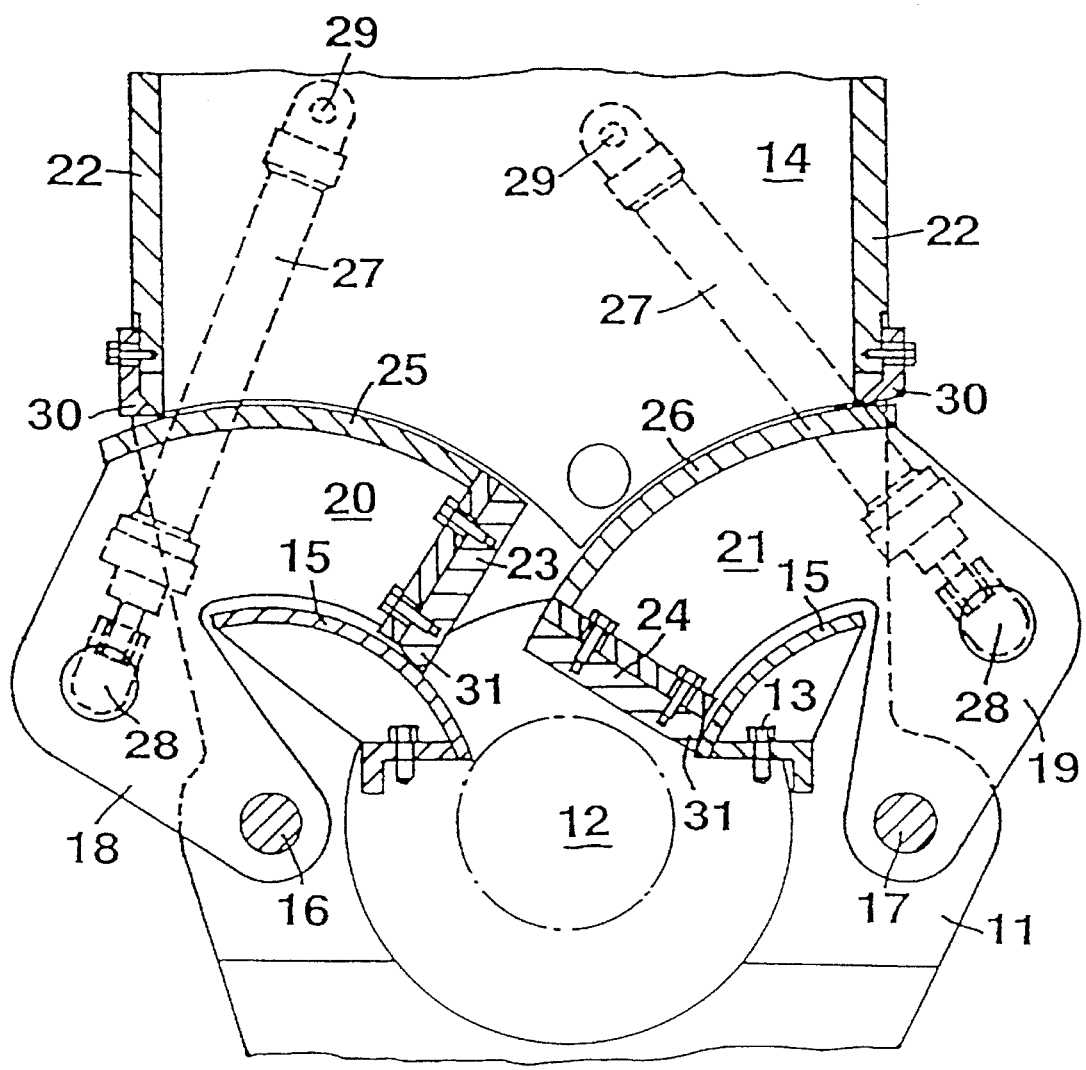
FIG. 4 the loading device of a screw-type extruding machine in a section transverse to the barrel of the barrel extruder.
Figure 5:
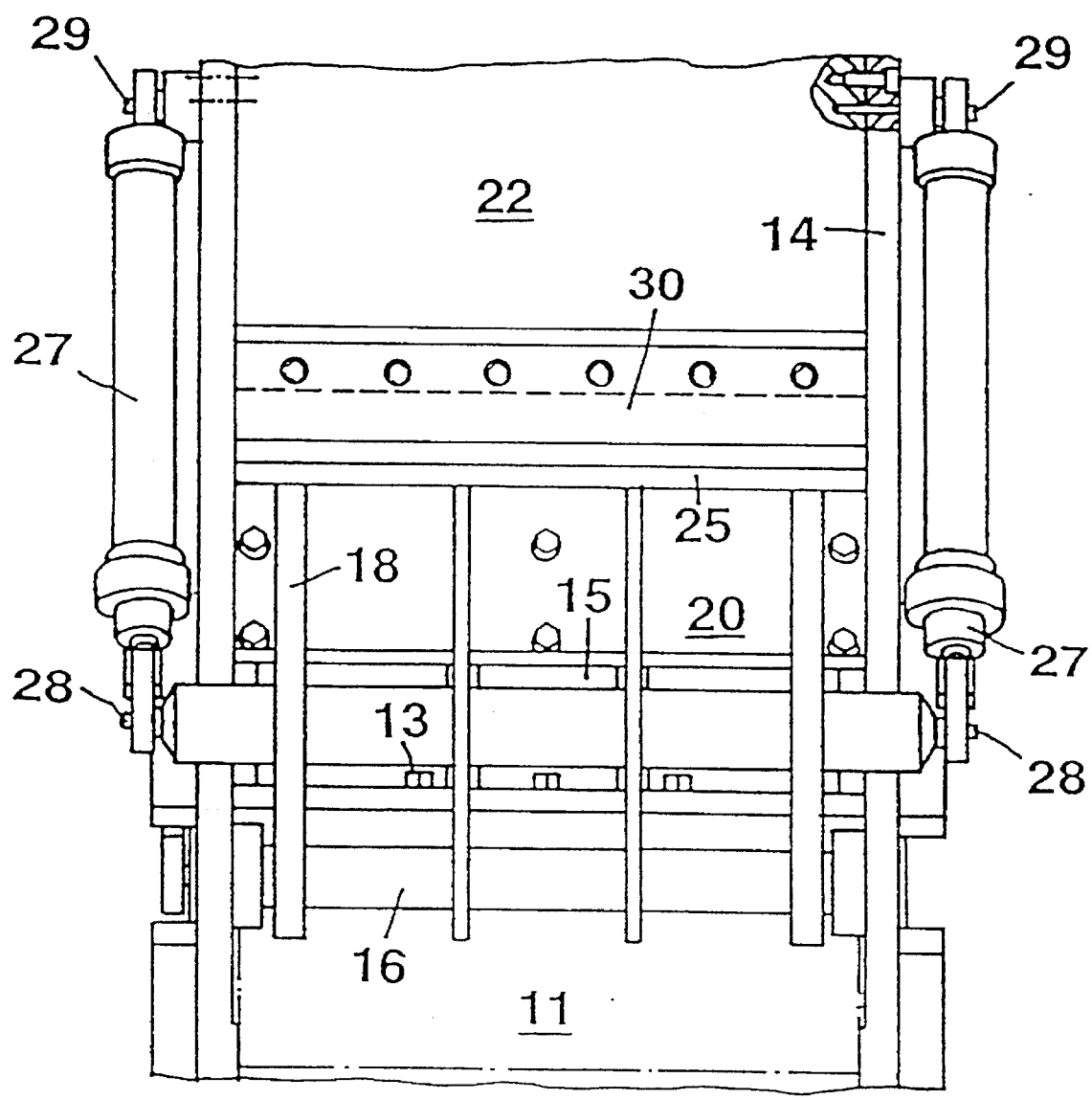
FIG. 5 the loading device of FIG. 4 in a side view.

In the loading device shown in FIGS. 4 and 5, a feed chute 14 for loading the extruder with processing material, for example, caoutchouc to be kneaded, is attached via screws to an extruder housing 11 for receiving a barrel extruder 12. The feed chute 14 narrows at its lower end over a transition wall 15 and lies with the remaining opening above a corresponding opening in the extruder housing 11. To the side of the extruder housing 11, two pivot axes 16 and 17 are disposed at the height of the axis of the barrel extruder 12 and extend parallel thereto. Stands 18 and 19 of two tamping tools 20 and 21 that are configured in the manner of bell-crank levers are seated to pivot around these pivot axes 16 and 17. The tamping tools 20 and 21 penetrate the wall 22 of the feed chute 14 and are each provided with a front plate 23 and 24, as well as side walls, of which the upper ones are represented by 25 and 26. The tamping tools 20 and 21 are pivotable by means of hydraulic drives 27, which are hinged to the stands 18 and 19 via points of articulation 28 and to the feed chute 14 at joined points 29. The length of the side walls of the tamping tools 20 and 21 corresponds to the stroke of the pivot movement between the inwardly-pivoted position shown in FIG. 4 and the outwardly-pivoted position, in which the front plates 23 and 24 seal the associated opening in the wall 22 of the feed chute 14 flush. The transition wall 15 is shaped to correspond to the movement of the inside side wall of the tamping tools 20 and 21. The feed chute 14 is provided with an inwardly-oriented stripper 30 at the edge of the relevant opening brushed by the outside side wall 25 and 26 of the tamping tools 20 and 21. On their edges facing the transition wall 15, the front plates 23 and 24 of the tamping tools 20 and 21 have stripper edges 31, with which they glide along the transition wall 15.

We claim:

1. Loading device for at least one of a kneader and a screw-type extruding machine, comprising:
    a feed chute having a loading opening located in a side of the feed chute, and a separate entrance opening, the feed chute being bent in a circular arc shape and extending to the at least one of the kneader and screw-type extruding machine; and
    at least one tamping tool located within said feed chute and projecting through the entrance opening, said at least one tamping tool including a front plate, said at least one tamping tool being bent in a circular arc shape corresponding to the circular arc shape of said feed chute and being pivotable around a pivot point that forms a mid-point of the circular arc shape of both said feed chute and said at least one tamping tool, the front plate following a circular arc-shaped path of movement.

2. Loading device as defined in claim 1, further comprising cooling bores, on an underside of the at least one tamping tool.

3. Loading device as defined in claim 1, further comprising one of a plurality of strippers and bristles; wherein said at least one tamping tool has an underside having grooves for receiving the at least one of said bristles and said strippers.

4. Loading device as defined in claim 1, further comprising drive means for actuating said at least one tamping tool as a bell-crank lever whereby the pivoting of the at least one tamping tool is effected.

5. Loading device as defined in claim 1, wherein said at least one tamping tool comprises two contiguous tamping tools.

6. Loading device for a screw-type extruding machine as defined in claim 5, wherein each said tamping tool has a path of movement each extending opposite one another in a plane that is transverse to a barrel extruder of the screw-type extruding machine, the feed chute having a planar wall in a region of the tamping tools that is provided with an opening for the passage of each said tamping tool, and the tamping tools being seated to pivot around respective pivot axes, the respective pivot axes being in an extension of the feed chute on both sides of the barrel extruder at a height of the barrel extruder and parallel to the barrel extruder.

7. Loading device as defined in claim 6, wherein each said tamping tool has a front plate and a side wall, each said side wall having a length that corresponds to a stroke of the tamping tools, each said side wall adjoining the respective front plate in the direction of the path of movement.

8. Loading device as defined in claim wherein the feed chute has a transition wall, the feed chute being provided with inwardly-oriented strippers in a region of the respective side wall on a side remote from the barrel extruder, and the front plate of each said respective tamping tool is provided on a side of said tamping tool facing the pivot axes with a stripper edge that glides along the transition wall of the feed chute, the transition wall being bent in a direction toward the barrel extruder to accommodate the movement of the two tamping tools.

9. Loading device as defined in claim 1, wherein said at least one tamping tool is pivotable to be completely out of said feed chute.

* * * * *